United States Patent [19]
Schillaci et al.

[11] Patent Number: 5,703,929
[45] Date of Patent: *Dec. 30, 1997

[54] WIRELESS-WIRELINE COMMUNICATION SELECTION MECHANISM RESIDENT IN CRAFTSPERSON'S PORTABLE TEST AND COMMUNICATIONS DEVICE

[75] Inventors: Onofrio Schillaci, Camarillo; Michael D. Horton, Ojai, both of Calif.

[73] Assignee: Harris Corporation, Melbourne, Fla.

[*] Notice: The term of this patent shall not extend beyond the expiration date of Pat. No. 5,521,958.

[21] Appl. No.: 735,462

[22] Filed: Oct. 23, 1996

Related U.S. Application Data

[63] Continuation of Ser. No. 338,916, Nov. 14, 1994, Pat. No. 5,583,912, which is a continuation-in-part of Ser. No. 235,317, Apr. 29, 1994, Pat. No. 5,521,958.

[51] Int. Cl.$^6$ .................. H04M 1/24; H04M 3/08; H04M 11/00
[52] U.S. Cl. .................. 379/21; 379/27; 379/58; 379/59; 455/67.1
[58] Field of Search .................. 379/1, 21, 27, 379/29, 24, 30, 58, 34, 32, 59, 60; 370/242, 243, 248, 246; 455/33.1, 67.1

[56] References Cited

U.S. PATENT DOCUMENTS

| | | | |
|---|---|---|---|
| 4,922,516 | 5/1990 | Butler et al. | 379/21 |
| 5,408,520 | 4/1995 | Clark et al. | 379/59 |
| 5,521,958 | 5/1996 | Selig et al. | 379/21 |

*Primary Examiner*—Curtis Kuntz
*Assistant Examiner*—Paul Loomis
*Attorney, Agent, or Firm*—Charles E. Wands

[57] ABSTRACT

A portable communications unit contains both wireless and wireline communication capability, through a selected one of which a craftsperson may establish a communication path with a test system of a telephone office. The test system responds to commands supplied over the established communication path supplies messages to the user's communication unit for providing a user with information for controlling the operation of a test head that is connectable to a subscriber line. The communications unit has a contact-sensitive visual display, which converts touch inputs into control signals that are transmitted to the test system and through which information associated with the operation of the test system is presented to the user. The user's communication unit is operative, in response to a user's request for the establishment of a communication path between the communications unit and the test system, to attempt to place the communications unit in wireless communication with the telephone office. If the wireless path is unavailable, a message is displayed instructing the user to use a wireline path.

9 Claims, 4 Drawing Sheets

WIRELESS-WIRELINE COMMUNICATION SELECTION MECHANISM RESIDENT IN CRAFTSPERSON'S PORTABLE TEST AND COMMUNICATIONS DEVICE

CROSS-REFERENCE TO RELATED APPLICATIONS

This is a continuation of application Ser. No. 08/338,916, filed Nov. 14, 1994 now U.S. Pat. No. 5,583,912 (which is a continuation-in-part of application Ser. No. 235,317, filed Apr. 29, 1994, now U.S. Pat. No. 5,521,958).

The present application is a continuation-in-part of co-pending application Ser. No. 235,317 (hereinafter referenced as the '317 application), filed Apr. 29, 1994, entitled: "Telecommunication Test System Including a Test and Trouble Shooting Expert System," by K. R. Selig et al, assigned to the assignee of the present application, and the disclosure of which is herein incorporated. In addition, the subject matter of the present application relates to that described in co-pending application Ser. No. *, filed coincidently herewith, by Dana Heins et al, entitled: "Display-Based Control Mechanism Resident in Portable Test and Communications Device for Facilitating Craftsperson's Remote Testing of Selected Portion of Telephone Network," (hereinafter referred to as the Heins et al application) also assigned to the assignee of the present application, and the disclosure of which is incorporated herein.

FIELD OF THE INVENTION

The present invention relates in general to telephone communication systems and networks, and is particularly directed to a new and improved communications control mechanism resident in and employed by a craftsperson's portable test/communications device for selectively establishing either a wireless or wireline communication path between the portable test/communications device and a remote telephone network facility.

BACKGROUND OF THE INVENTION

FIG. 1 diagrammatically illustrates the general configuration of the portable telecommunications test system described in the above-referenced co-pending '317 application, as comprising a hand-held personal computer-based test and communications unit 10, through which a craftsperson, who has been dispatched to a service site that is remotely located with respect to a central office 12 serving a line to be tested (or line under test (LUT)) 16, may communicate with central office 12 and with a generic test head 14 that is connectable to the LUT 16. Supervisory control of the operation of portable unit 10 may be effected by means of a Newton™ computer available from Apple Computer Corporation.

As described in the '317 application, and in greater detail in the Heins et al application, the test system functionality of the software contained within the craftsperson's hand-held computer unit 10 is operative to provide the service technician with a user-friendly, step by step, test procedure that is designed to facilitate the craftsperson's ability to perform various tests on a selected line. In so doing, the craftsperson's portable computer is able to interact with multiple types of existing operational support systems, as well as provide a platform for add-on information exchanges.

For this purpose, via a contact-sensitive (e.g., pen touch-operated) video display panel 15, and an associated keyboard 17 of hand-held computer unit 10, the craftsperson may selectively invoke one or more test operations represented by a set of analysis and test function-associated icons. In response to these selections, the internal processor of unit 10 executes communication and signal processing operations associated with an identified test.

The test head 14 proper performs all data acquisition on demand from the personal computer unit 10, including functional tests. Test head 14 and hand-held personal computer unit 10 can be expanded through plug-in cards and software programs for coupling with various diverse types of communication links. The plug-in cards of the test head 14 may comprise a number of cards for coupling with various lines to be tested, such as, but not limited to, an analog telephone circuit card, an analog PL/SS card, a digital card for coupling with high speed digital transmission circuits, a fiber optic card for coupling with a fiber optic line, an integrated services digital network (ISDN) "U"0 interface card for coupling with an ISDN line, a community access television (CATV) card for coupling with a CATV transmission link; and an optical loop carrier/digital loop carrier card. Alternatively, the functionality of such plug-in cards may be implemented in communication application software that is executed by hand-held computer unit 10 or by a processor in the test head.

In order to communicate with remote office 12 or with a data center 18 associated with the central office 12, the craftsperson's computer unit 10 contains a transceiver interface, that enables it communicate with a communication and signal processing subsystem on board a technician's service vehicle or van 20, which links the craftsperson's unit 10 with a remote network facility.

The service van's communication and signal processing subsystem 22 includes a batteryholder/charging station 24, a printer 26, a long haul wireless interface 28 and a network server 29. Battery holder/charging station 24 is configured to receive and store the portable hand-held computer unit 10, so that the computer unit 10 may be secured and stowed and its associated power supply (battery pack) may be recharged, when not in use. Printer 26 is available to print out various test results or other information. Long haul wireless interface 28 provides a wireless gateway to long haul wireless services, while network server 29 contains a file server that provides additional processing power and electronic data storage. Network server 29 is operative to perform auxiliary data processing tasks on demand from the computer unit 10.

A telephone network's remote central office facility 12 typically includes a central office switch 31, central office test devices 33, and a line-conditioning device 35, such as a direct access test unit (DATU). The central office test devices 33 are capable of providing an interface with various operational support systems of the data center 18, such as a service vehicle dispatch, outside plant record database, automated testing systems, and electronic network schematics. The line-conditioning device (DATU) 35 within central office 12 provides the craftsperson with the ability to selectively conduct a number of tests of a line, by invoking specified key combinations (sequences) from a standard craftsperson's telephone test set.

In the course of conducting a test via test head 14, the craftsperson's personal computer unit 10 receives the raw measured data from the test head and operates on the received data to convert the measurement results into usable parameter information. This usable parameter information is then linked to the service vehicle's communication subsystem 22, so that it may be forwarded to a line-conditioning device or automated test equipment in central office 12.

In a non-limiting example of responding to a customer service request, the portable telecommunications test system of FIG. 1 operates as follows. A craftsperson who has been dispatched to a test site (using service vehicle 20) proceeds to physically couple the test head 14 to the line under test. Using computer unit 10, the technician then establishes communications with the test head 14 and, via the communication subsystem 22 in van 20, with the central office, so that one or more tests may be placed on the line.

Using the contact-sensitive computer display panel 15, once the technician has coupled the test head 14 to the line under test, the test application software resident in hand-held computer unit 10 is operative to display icons associated with respective test procedures for evaluating the LUT. In response to the service technician selecting a desired test function, the resident test software of computer unit 10 proceeds to interactively generate additional menus through which the craftsperson specifies further choices for defining parameters required for implementing the selected test. Based upon the choices selected by the craftsperson, computer unit 10 assembles and transmits a message to the test head and to the central office for establishing what test or tests are to be conducted and the parameters associated with those tests.

The test head 14 measures the response of the line to various conditions placed on the line, and transmits the test response data back to computer unit 10. As pointed out above, computer unit 10 takes the raw data transmitted from the test head 14 and processes the data in accordance with an on-board test or line analysis program. Based upon the results of the processed information, the craftsperson may direct the test device to perform one or more additional tests, until the line has been completely tested.

As further described in the '317 application, the craftsperson may be provided with an auxiliary voice-activated, wireless headset for conducting wireless voice communications with hand-held computer unit. Such a wireless headset can be used with the hand-held computer and the test head to run automated tests, with an audio go/no-go indication of the test results being provided to the craftsperson. In addition, the transceiver interface within the craftsperson's portable unit may conduct communications via either a short haul wireless link, or by way of an auxiliary back-up wireline link.

SUMMARY OF THE INVENTION

The present invention is directed to a prescribed communication path establishment mechanism that is incorporated into the craftsperson's portable unit and in the communications equipment of the attendant service vehicle, and is operative to controllably select one of the above mentioned short haul wireless link and auxiliary back-up wireline link as the communication path through which the craftsperson's portable unit may conduct communications with a remote office. The preferred path is a wireless path, accomplished through a wireless communication subsystem in the technician's service vehicle, so that the craftsperson is freed from the need to effect a physical connection between the portable unit and a wireline port, thereby providing a more rapid response and making not reducing the technician's mobility.

More particularly, the present invention is directed to an arrangement for establishing a communication path between the craftsperson's portable communication and processing unit, through the operation of which testing of a subscriber line of a telephone network may be conducted by means of a test system (e.g. DATU) at the remote telephone facility (e.g., central office), or portable test equipment co-located with the craftsperson. As pointed out above, at the remote telephone facility, the test system is operative to respond to commands from the user's portable communication and processing unit and to supply messages to the user's portable unit, thereby providing the craftsperson with information for controlling the operation of the test system.

The craftsperson's portable unit includes a transceiver, which has the capability of conducting communications with an external communications device through either a wireless or a wireline communication path, the wireline being a modem to a telephone facility-resident test system (e.g. direct access test unit), or a serial link to portable test equipment or printer. The communications control software within the portable communication and processing unit is operative, in response to a user's request for the establishment of a communication path between the user and the test system of the remote telephone facility, to establish one of wireless and wireline communication paths to the telephone facility.

The communications equipment of the attendant service vehicle contains an auxiliary communication and signal processing subsystem, through which a first wireless communication path may be established with the craftsperson's portable unit, and through which a second wireless communication path may be established with the remote telephone facility. The communication control mechanism of the portable unit is operative, in response to the user's request for the establishment of a communication path to the test system of the remote telephone facility, to determine the availability of the first wireless communication path. If the first wireless path is available, the control mechanism then checks for the availability of the second wireless communication path.

If the first wireless path is unavailable or, even though the first wireless path for connection to a remote test system or data center is available, the second wireless path is unavailable, the portable unit's display prompts the craftsperson to connect to an auxiliary back-up wireline communication path. Such a prompting message to the craftsperson, like other messages within display screen menus, operates as an instruction to the technician of what to do next, thereby reducing the skill required of an entry level or 'rookie' technician. If both the first and second wireline paths are available, they are engaged to establish a wireless path to the remote office, and a follow-up functional test menu is displayed on the portable unit, as described in the above-referenced '317 and Heins et al applications.

Similarly, where the target device is an auxiliary subsystem, such as a portable test unit or printer having an attendant wireless communications unit, if the first wireless path is unavailable or, even though the first wireless path is available, a second wireless path through the attendant communications unit is unavailable, the portable unit's display prompts the craftsperson to connect a wireline port of the craftsperson's portable unit directly to the target device (portable test equipment or printer) via an auxiliary back-up wireline communication path. If both the first and second wireline paths are available, they are engaged to establish a wireless path to the target device.

The architectural configuration of the craftsperson's portable unit includes a supervisory control processor and a communications subsystem with which processor is coupled. As described above, the portable unit's control processor is responsive to contact-sensitive inputs to a display panel, or operation of an associated keyboard, to selectively invoke one or more communication and test operations.

The communications subsystem of the user's portable unit comprises a communications processor and associated transceiver components for enabling communications to be conducted with an external communications device through either a wireless or a wireline link. For wireless data and audio communications, a radio is provided. It is preferably contained within a wireless local area network (WLAN) half-bridge unit. For wireline communications, the communications processor is coupled with a codec and a wireline modem for audio communication signalling, and a digital link for digital data signalling. The control software of the communications control processor contains a communications establishment routine through which one of a wireless (default) and wireline link is selectively established between the craftsperson's portable unit and the service van, and thereby to a remote facility.

The communication subsystem for providing wireless and wireline signalling capability within the service van includes another WLAN half-bridge unit, which contains a radio and an associated communications processor. Via an associated antenna, the radio is coupled with an RF channel link to the portable unit. The service van's communications processor is coupled to an attendant network server, that contains a file server providing additional processing power and electronic data storage. The service van's communications processor is further coupled via a serial digital data link to a long haul wireless interface, that provides a wireless gateway to long haul wireless services for establishing a wireless communication link with a remote telephone facility (central office or data center).

The long haul wireless interface includes a codec containing analog-to-digital, and digital-to-analog conversion circuitry for interfacing analog (voice) format communication signals with an attendant cellular radio unit. The service van's communications processor is further coupled via a digital data interface to a printer.

DETAILED DESCRIPTION

Figure 1:
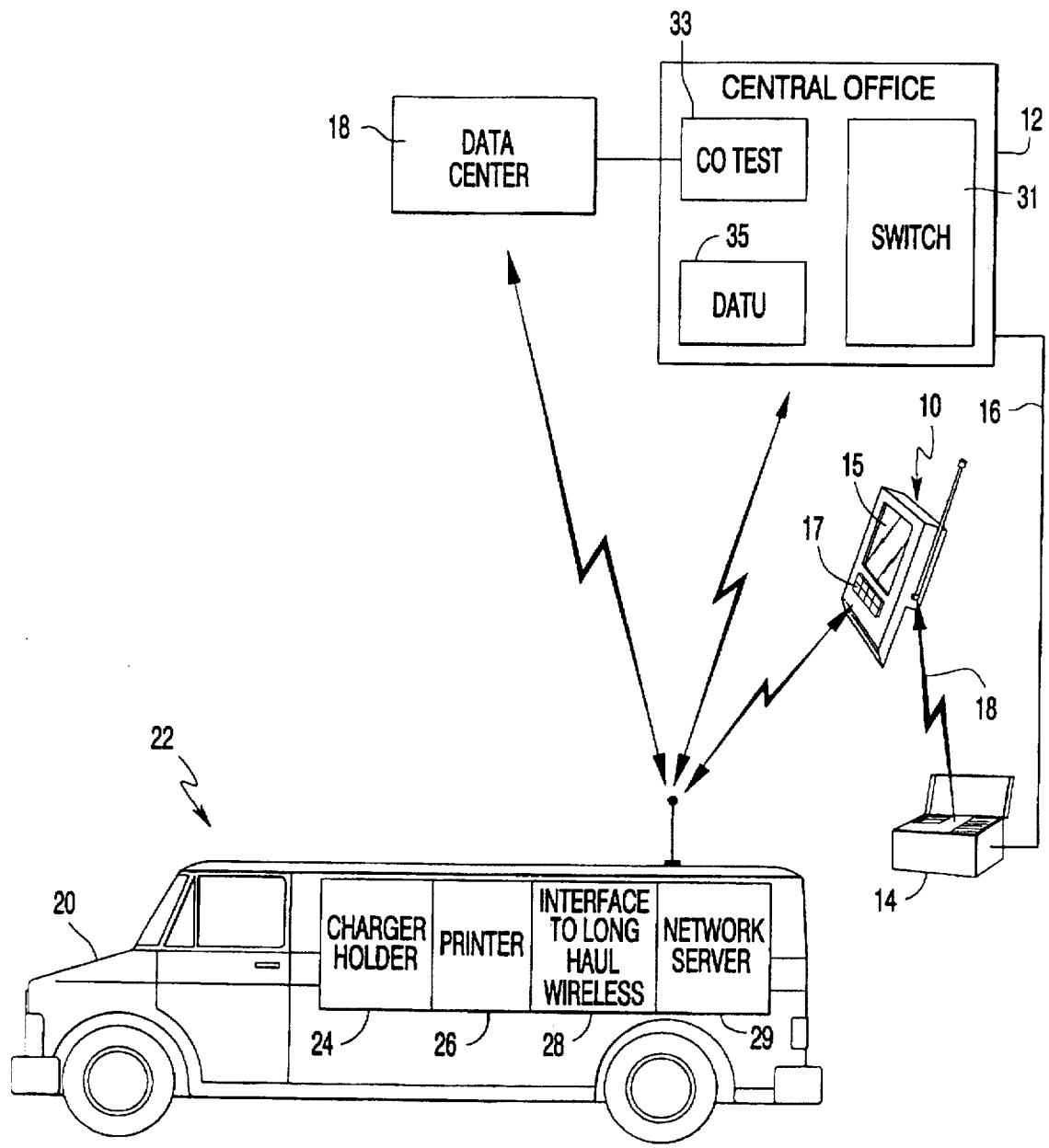
FIG. 1 diagrammatically illustrates a portable telecommunications test system as described in the above-referenced co-pending '317 application.

Before describing in detail the new and improved wireless—wireline communication selection mechanism in accordance with the present invention, it should be observed that the present invention resides primarily in what is effectively a dual capability (wireless and wireline) communications link arrangement and an associated link establishment routine that is embedded in the communications control software resident in the craftsperson's portable computer unit, through which a communication link between the craftsperson's unit and a remote facility is interactively automated.

Consequently, the present invention has been illustrated in the drawings in readily understandable block diagram format, which show only those specific details that are pertinent to the present invention, so as not to obscure the disclosure with details which will be readily apparent to those skilled in the art having the benefit of the description herein. Thus, the block diagram illustrations are primarily intended to illustrate the major components of the system in a convenient functional grouping, whereby the present invention may be more readily understood.

Figure 2:
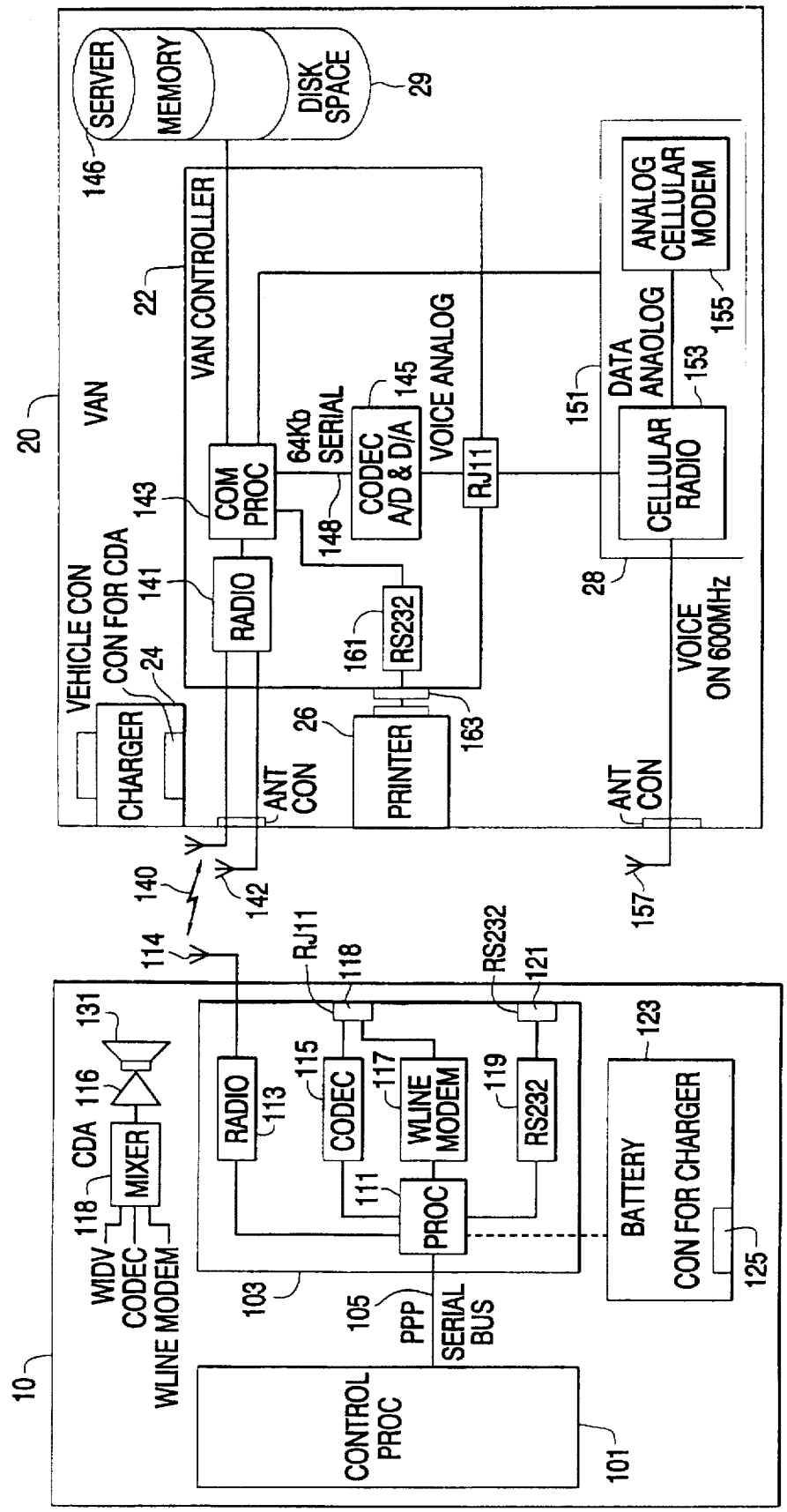
FIG. 2 diagrammatically illustrates configurations of (wireless and wireline) communication establishment arrangements contained in each of the portable test unit 10 and service van 20 of FIG. 1.

Referring now to FIG. 2, the configurations of the (wireless and wireline) communication establishment arrangements contained in each of the portable test unit 10 and service van 20 are diagrammatically illustrated. More particularly, the craftsperson's portable unit 10 includes a supervisory control processor 101 (the above-referenced Newton computer) and a communications subsystem 103 with which processor 101 is coupled by way of a serial communications bus 105. As described briefly above, and as set forth in the above-referenced co-pending applications, control processor 101 is responsive to contact-sensitive inputs to a display panel, or operation of an associated keyboard, to selectively invoke one or more communication and test operations.

Communications subsystem 103 comprises a communications processor 111, such as a Motorola 68360-based processor chip, to which bus 105 is ported, and a set of associated transceiver components for enabling unit 10 to conduct communications with an external communications device through either a wireless or a wireline link. By wireless is meant that no physical connection is provided between the craftsperson's unit and a communication connection port. The frequency band of wireless communication is not limited to a specific range and may include RF, infrared and visible light, for example. Similarly, the modulation format of the wireless link is not limited. For example, as pointed out in the above-referenced '317 application, spread spectrum modulation may be employed.

For wireless data and audio (voice) communications, a radio 113 having an antenna 114 is provided. In accordance with a non-limiting embodiment, processor 111 and radio 113 may comprise a commercially available integrated unit, such as a 'Grouper' wireless local area network (WLAN) half-bridge unit, manufactured by Digital Ocean of Kansas City, Kans. To provide a wireline communication path, communications processor 111 is shown as being coupled with a codec 115 and a wireline modem 117 for audio (voice) communication signalling, and a digital data interface (such as an RS232 or RS488 interface) 119 for digital data signalling. Each of codec 115 and modem 117 may be ported to a conventional telephone wireline connection jack, such as an RJ11 jack 118, while RS232 interface 119 may be ported to a conventional multi-pin digital data port connector 121, as shown. For compact mechanical expediency, a single connector may be configured to accommodate the connections provided by each of the RJ11 jack and the digital data port connector 121.

As will be described below with reference to FIG. 3, processor 111 contains a communications establishment routine through which one of a wireless (default) and wireline link is selectively established between unit 10 and van 20, and thereby between unit 10 and a remote facility. Also shown in FIG. 2 is a battery pack 123, which supplies internal power to the portable unit 10, and an associated charging connection port 125. Unit 10 further includes an audio speaker 131, which is interfaced with processor 111, codec 115 and wireline modem 117 via a driver amplifier 116 and a mixer unit 118, for providing an audio presentation of that audio (voice and tone) signals generated within the unit.

The communication circuitry for providing wireless and wireline signalling capability within service van 20 is diagrammatically illustrated in FIG. 2 as including another WLAN half-bridge unit, such as the above-referenced 'Grouper' unit, manufactured by Digital Ocean, which contains a radio 141 and an associated communications processor 143. Via antenna 142, radio 141 is coupled with an RF channel 140 link to unit 10. The van controller's communications processor 143 is served by an attendant network server 29, containing a file server 146 that provides additional processing power and electronic data storage. As noted above, providing a network server within the craftsperson's service vehicle provides the craftsperson with the capability of requesting the execution of auxiliary data processing tasks on demand from the portable computer unit 10.

Communications processor 143 is further coupled via a standard 64 Kbit serial digital data link 148 with the above-referenced long haul wireless interface 28 that provides a wireless gateway to long haul wireless services for establishing a wireless communication link with central office 12 or data center 18. For this purpose, wireless interface 28 includes a codec 145, to which digital data link 148 is ported. Codec 145 contains analog-to-digital, and digital-to-analog conversion circuitry for interfacing analog (voice) format communication signals with an attendant cellular radio unit 151. As a non-limiting example, cellular radio unit 151 may comprise a Motorola CTM 2400 unit, having a cellular radio 153 and an attendant analog cellular modem 155, for supporting analog voice signalling formats. Cellular radio unit 153 has an attendant antenna 157 for RF communications with a remote facility, such as central office 12 or data center 18. Communications processor 143 is further coupled via an RS232 interface 161 and an associated digital data connection port 163 to printer 26, referenced previously.

As pointed out briefly above, a significant feature of the present invention is that fact that it not only enables a communication link between the craftsperson's portable unit and a remote facility to be selectively established as either a wireless or wireline link, but does so in a manner that permits a lesser skilled craftsperson to operate the test system. Pursuant to a preferred embodiment of the present invention, the communications control software resident within the control processors of the WLAN half-bridge units is augmented to execute the routine shown in the processing flow diagram of FIG. 3, which initially defaults to the wireless mode, if available. If a wireless path from the craftsperson's unit is unavailable, then a message is displayed, informing the user that it is necessary to connect the unit to a wireline path.

Figure 3:
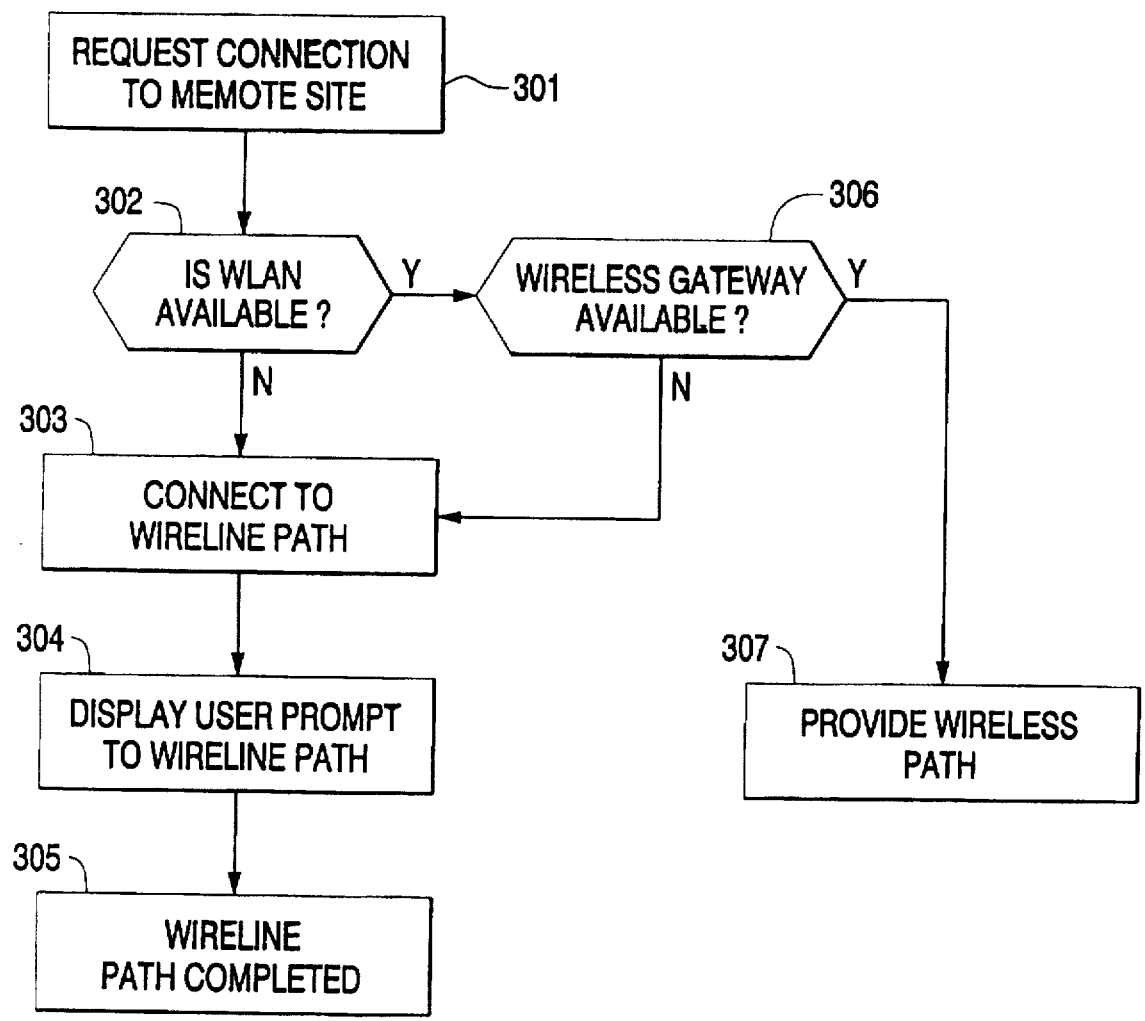
FIG. 3 shows the operational flow sequence of the interactive wireless—wireline communication establishment mechanism of a first embodiment of the present invention associated with the arrangement of FIG. 2.

More particularly, as shown in FIG. 3, at the beginning of the operational flow sequence of the interactive communications path selection mechanism in accordance with the present invention, the unit is initially in an idle or wait state 300. In step 301, the craftsperson requests a connection to a remote site (e.g. for exercising the DATU function in central office 12). As noted previously, the default condition of the unit is a wireless connection. Therefore, in response to this request, in step 302, a query is made to determine if the wireless local area network provided by the pair of WLAN half bridges in unit 10 and service van 20 is available. Namely, is a wireless link to the van available? If the answer to query step 302 is NO, it is concluded that the unit 10 must be connected to a wireline path (step 303) and, in step 304, and a message is displayed on the display screen shown, which prompts the user to connect the unit to an available wireline port. In step 305, a wireline modem connection is made.

If the answer to query step 302 is YES, a query is made in step 306 to determine whether long haul wireless interface 28 is capable of providing a wireless gateway to long haul wireless services for establishing a wireless communication link with central office 12 or data center 18. IF the answer to query step 306 is NO, it is again concluded that the unit 10 must be connected to a wireline path (step 303), and step 304 is executed, causing a message to be displayed on the display screen shown, which prompts the user to connect the unit to an available wireline (modem) port.

If long haul wireless interface 28 is capable of providing a wireless gateway, then the answer to query step 306 is YES, and a connection to interface 28 is made in step 307. With this connection, a menu associated with the available options for use by the craftsperson, such as the DATU access menu, described in the above-referenced Heins application is displayed.

Figure 4:
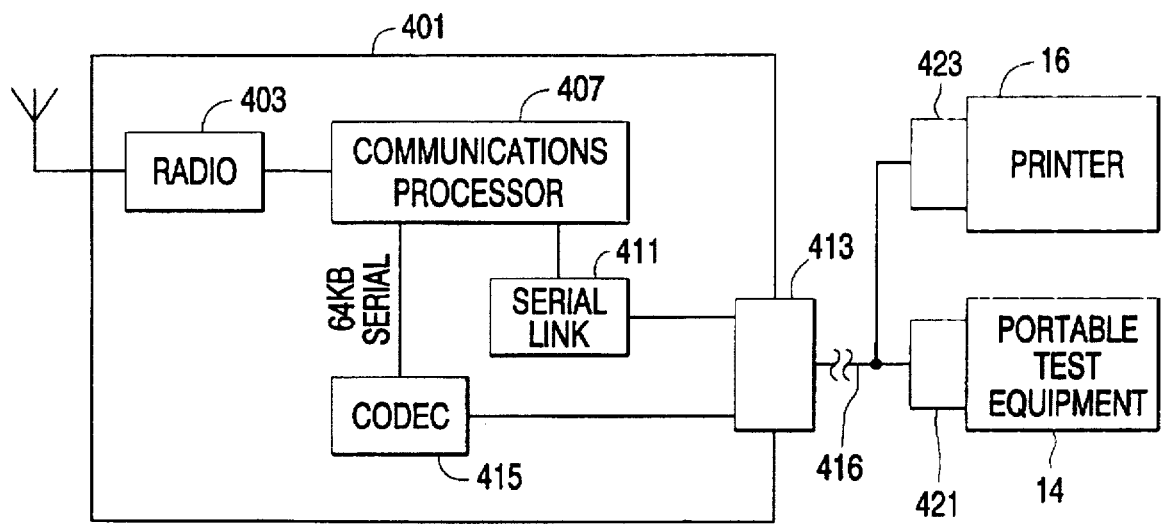
FIG. 4 diagrammatically illustrates a configuration of a wireless and wireline communication establishment arrangement for a local target device (e.g., portable test equipment or printer)

As pointed out above, in addition to being capable of selectively establishing either a wireless or wireline communication link with a remote test system or data center, the present invention is also capable of effecting either link with a 'local' device, such as portable test equipment device 14 or printer 26, that is equipped with an attendant device that provides wireless communication path, as diagrammatically illustrated at 401 in FIG. 4. More particularly, as shown therein, such an attendant device comprises a radio 403 having an antenna 405. Radio 403 is coupled to an associated communications processor 407. As described above, radio 403 and communications processor 407 may comprise a commercially available integrated unit, such as the previously referenced 'Grouper' wireless local area network (WLAN) half-bridge unit.

To provide a wireline communication path, communications processor 407 is shown as being coupled via a standard 64 Kbit serial digital data link 411 to a serial data connector 413, such as an industry standard DB25 serial port. Communications processor 407 is also coupled to a codec 415, which is also ported to serial port 413. As in the embodiment shown in FIG. 2, described above, codec 415 contains analog-to-digital, and digital-to-analog interfacing circuitry. Serial port 413 may be coupled via a serial data link 416 to a corresponding serial data port 421 of portable test unit 14 or a corresponding serial data port 423 of printer 16.

Figure 5:
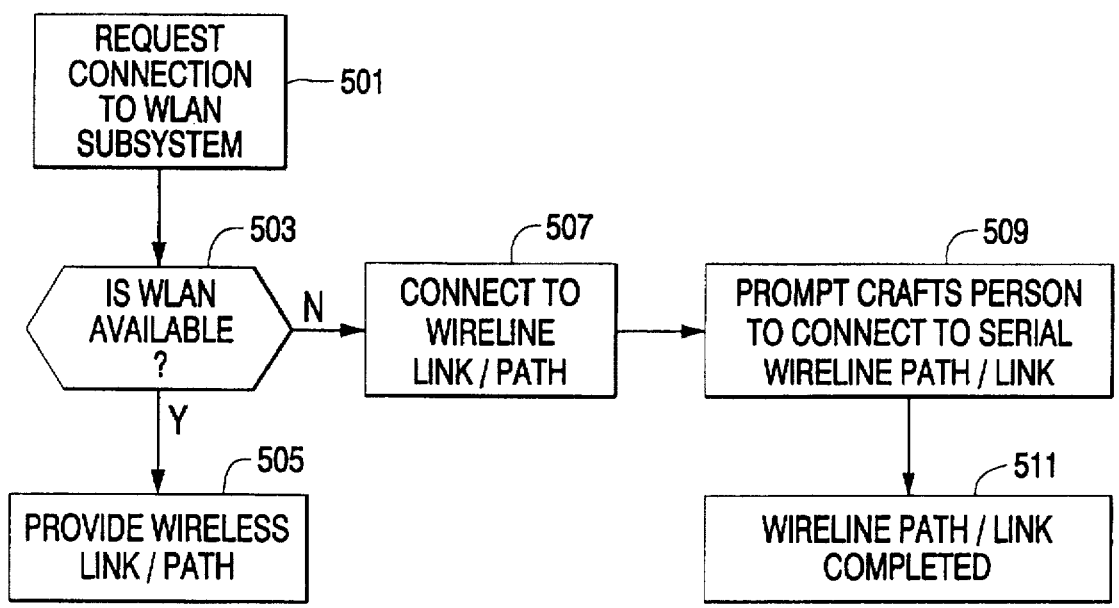
FIG. 5 shows the operational flow sequence of the interactive wireless—wireline communication establishment mechanism of a second embodiment of the present invention associated with the arrangement of FIG. 4.

FIG. 5 shows an operational flow sequence for selectively providing a wireless/wireline communication path to a local device shown in FIG. 4. In response to a request for a wireless local area network connection in step 501, an inquiry is made in step 503 as to whether a wireless path to the local device is available. If a wireless path is available (the answer to query step 503 is YES), a wireless path is provided in step 505. If the answer to query step 503 is NO, a decision is made in step 505 that a wireline path must be provided. In response to this decision, in step 509 a message is displayed on portable unit 10 instructing the craftsperson to connect the serial port of the target device (port 421 of portable test unit 14, or port 423 of printer 26) to the serial data port 121 of unit 10. Once this connection is established, a wireline path is initiated in step 511.

As can be seen from the operations carried out by the foregoing routine, through which the communications control routines embedded in the WLAN half-bridge units of each of the craftsperson's portable unit and the van controller within the service vehicle provides access to one of a wireless and wireline link to the remote site, the present invention is operative to selectively establish one of a wireless and wireline link, in a manner that prompts the user and therefore permits a lesser skilled craftsperson to operate the test system.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. An arrangement for establishing a communication path between a user's portable communication and processing unit, through the operation of which testing of a subscriber line of a telephone network may be conducted by means of a test system that is coupled to said subscriber line and is placed in communication with said user's portable communication and processing unit, said arrangement comprising a transceiver within said user's communication and processing unit which is operative, in response to a user's request for the establishment of a communication path between said user's communication and processing unit and said test system, to establish said communication path between said user's communication and processing unit and said test system by means of one of a plurality of wireless communication systems located between said test system and said user's communication and processing unit.

2. An arrangement according to claim 1, wherein said user's communication and processing unit has an input/output device, including a visual display, through which information input by said user is converted into prescribed control signals and transmitted to said test system of said telephone facility, and through which information associated with the operation of said test system is presented to said user.

3. An arrangement according to claim 1, wherein said test system is separate from said telephone facility and is arranged to test said subscriber line, and wherein said user's communication and processing unit is operative to establish a wireless communication path by way of a wireless communication system located between said test system and said user's communication and processing unit.

4. An arrangement according to claim 1, wherein said test system is provided at said telephone facility and is arranged to test said subscriber line from said telephone facility, and wherein said user's communication and processing unit is operative to establish a wireless communication path by way of a wireless communication system located between said telephone facility and said user's communication and processing unit.

5. An arrangement according to claim 4, wherein said wireless communication system includes a first wireless communication subsystem wirelessly linked to said user's communication and processing unit and a second wireless communication subsystem which is coupled to said first wireless communication subsystem and is wirelessly linked with to said telephone facility.

6. An arrangement according to claim 5, wherein said wireless communication system comprises a vehicle-supported wireless communication and signal processing system.

7. An arrangement according to claim 1, wherein one of said plurality of wireless communication systems includes a vehicle-supported communication and signal processing system.

8. An arrangement according to claim 1, wherein said test system includes a first test system provided at said telephone facility and arranged to test said subscriber line from said telephone facility, and a second test system arranged to test said subscriber line from a location separate from said telephone facility, and wherein said user's communication and processing unit is operative to selectively establish one of said plurality of wireless communication paths by means of a selected one of a first wireless communication system located between said first test system and said user's communication and processing unit, and by means of a second wireless communication system located between said second test system and said user's communication and processing unit.

9. An arrangement according to claim 8, wherein first wireless communication system comprises a vehicle-supported communication and signal processing subsystem.

* * * * *